United States Patent
Cartellone

Patent Number: 6,090,184
Date of Patent: Jul. 18, 2000

[54] FILTER SYSTEM

[75] Inventor: Mark A. Cartellone, Broadview Hts., Ohio

[73] Assignee: HMI Industries, Inc., Cleveland, Ohio

[21] Appl. No.: 09/032,589

[22] Filed: Feb. 27, 1998

[51] Int. Cl.$^7$ .................................................. B03C 3/011
[52] U.S. Cl. ................................. 95/69; 15/347; 15/353; 95/70; 95/78; 95/268; 95/271; 95/285; 95/287; 96/55; 96/58; 96/61; 96/63; 55/323; 55/337; 55/471; 55/486; 55/524; 55/DIG. 3
[58] Field of Search ............................ 55/357, 486, 521, 55/524, 323, 332, 337, 372, 376, 471, DIG. 2, DIG. 3, DIG. 39; 15/347, 348, 353; 96/61, 63, 57, 58, 55; 95/268, 271, 285–287, 63, 69, 70, 78

[56] References Cited

U.S. PATENT DOCUMENTS

| | | | |
|---|---|---|---|
| 2,242,278 | 5/1941 | Yonkers, Jr. | 55/471 X |
| 2,627,936 | 2/1953 | Martinet | 55/471 X |
| 2,627,937 | 2/1953 | Martinet | 55/372 |
| 3,343,344 | 9/1967 | Fairaizl et al. | 55/376 |
| 3,500,517 | 3/1970 | Dekker et al. | 264/147 X |
| 3,608,024 | 9/1971 | Yazawa | 264/103 |
| 3,870,495 | 3/1975 | Dixson et al. | 55/489 |
| 3,966,597 | 6/1976 | Omori et al. | 264/51 X |
| 3,998,916 | 12/1976 | van Turnhout | 264/436 |
| 4,365,980 | 12/1982 | Culbert et al. | 55/315 |
| 4,374,888 | 2/1983 | Bornslaeger | 428/286 X |
| 4,504,290 | 3/1985 | Pontius | 55/486 X |
| 4,650,505 | 3/1987 | Magdelain | 55/467 X |
| 4,702,753 | 10/1987 | Kowalczyk | 55/267 |
| 4,874,659 | 10/1989 | Ando et al. | 55/528 X |
| 4,886,527 | 12/1989 | Fottinger et al. | 55/DIG. 39 |
| 4,902,306 | 2/1990 | Burnett et al. | 55/528 X |
| 4,904,343 | 2/1990 | Giglia et al. | 55/528 X |
| 4,909,815 | 3/1990 | Meyer | 55/356 X |
| 4,917,942 | 4/1990 | Winters | 55/DIG. 39 |
| 5,037,455 | 8/1991 | Scheineson et al. | 55/528 X |
| 5,108,470 | 4/1992 | Pick | 96/58 |
| 5,112,677 | 5/1992 | Tani et al. | 55/DIG. 39 |
| 5,188,646 | 2/1993 | Nolen, Jr. | 55/486 X |
| 5,221,573 | 6/1993 | Baigas, Jr. | 55/DIG. 39 |
| 5,248,323 | 9/1993 | Stevenson | 55/337 X |
| 5,288,298 | 2/1994 | Aston | 55/486 X |
| 5,306,534 | 4/1994 | Bosses | 15/347 X |
| 5,307,538 | 5/1994 | Rench et al. | 55/DIG. 3 |
| 5,350,443 | 9/1994 | von Blucher et al. | 55/DIG. 39 |
| 5,350,620 | 9/1994 | Sundel et al. | 55/DIG. 39 |
| 5,478,377 | 12/1995 | Scavnicky et al. | 55/486 X |
| 5,593,479 | 1/1997 | Frey et al. | 96/57 |
| 5,641,343 | 6/1997 | Frey | 96/135 |
| 5,647,881 | 7/1997 | Zhang et al. | 55/DIG. 2 |
| 5,651,811 | 7/1997 | Frey et al. | 96/69 |
| 5,874,052 | 2/1999 | Holland | 55/486 X |

FOREIGN PATENT DOCUMENTS

42 40 172 A 1  6/1994  Germany.

*Primary Examiner*—Richard L. Chiesa
*Attorney, Agent, or Firm*—Vickers, Daniels & Young

[57] ABSTRACT

A vacuum cleaner having a reduced velocity chamber with a high velocity air inlet, an electric motor, a rotary mechanism driven by the motor for creating a vacuum in the chamber, an outlet for exhausting air from the chamber, which air flows in a selected path from the air inlet, through the chamber and out the air exhaust outlet and a disposable porous sheet filter layer in the chamber for removing large solid particles from the air. The vacuum cleaner also has an improved filter, wherein the improved filter includes a layer of material to remove very fine air particles and a layer of material to remove odors from the air.

29 Claims, 4 Drawing Sheets

FILTER SYSTEM

The present invention relates to the art of air filter systems and more particularly to an improved vacuum cleaner employing a novel filter element. The invention is particularly applicable for a canister type vacuum cleaner and it will be described with particular reference thereto; however, the invention has much broader applications and may be used to filter air by employing the novel filter element and filtering method as contemplated by the present invention.

INCORPORATION BY REFERENCE

Frey U.S. Pat. No. 5,593,479 and Stevenson U.S. Pat. No. 5,248,323 are incorporated herein as background information regarding the type of vacuum cleaner to which the present invention is particularly applicable. These two patents illustrate a canister type vacuum cleaner with a low velocity receptacle or chamber into which is placed a conical filter sheet formed from non-woven cellulose fiber and over a downwardly extending support structure for the purpose of removing particulate material from the air being processed through the vacuum cleaner. The rigid perforated conical support structure or member holds the filter sheet in its conical configuration. The support member and filter sheet are mounted together with the layer covering the rigid support member. Within the conical support member there is provided a generally flat disc shaped cellulose filter sheet for further removal of particulate solids as the solids pass with the air from the canister through the conical filter sheet and through the disc to the outlet or exhaust of the vacuum cleaner.

BACKGROUND OF INVENTION

A canister type vacuum cleaner is illustrated in the patents incorporated by reference herein and includes a reduced velocity chamber with a high velocity air inlet. Air is drawn into the chamber by an electric motor which drives a rotary means, or fan, for creating vacuum in the chamber to draw air laden with particulate material through the chamber and to force it from the outlet as exhausted clean air. Canister type vacuum cleaners normally include a conical filter extending downwardly into the canister or low velocity chamber and is formed of a porous mat to remove the dirt and debris carried by the air coming into the canister. The high velocity air drawn into the chamber has a tendency to entrain large solid particles which are brought into the low velocity chamber where the air is then swirled or vortexed in a centrifuge configuration with convolutions so that large particles carried into the chamber with the inlet air are extracted by the vortexed or cyclonic action of the air in the canister. Thereafter, the air is pulled upwardly through the conical filter toward an upper motor that drives a fan for creating a vacuum in the canister, or reduced velocity chamber, so that the air flowing upwardly through the conical filter passes through a filter disc and outwardly through an exhaust passage, or passages, above the canister. Stevenson U.S. Pat. No. 5,248,323 discloses an improvement to filters for vacuum cleaners by developing an activated charcoal containing filter which efficiently remove gaseous impurities, such as paint fumes and other odor creating gases which are in the air.

The canister type vacuum cleaner, as so far described, only removes the relatively large particles entrained in the air. Air particles of a size less than 10 microns pass freely through the filter medium and are recirculated in the room. Many of these small particles can act as irritants to an individual and the recirculation of such particles can increase the irritation to an individual. High density filters must be employed to filter out very small particles in the air; however, high density filters cause large pressure drops through the filter and thus cannot be used in standard vacuum cleaners or other air filtering systems. Frey U.S. Pat. No. 5,593,479 addressed this problem by disclosing a multi layer filter which included at least one layer of electrically charged fiber material incapuslated between at least two layers of support material. The multi-layer filter effectively removed very small particles from the air which penetrated the cellulose fiber layer. The patent also disclosed that a spongy non-woven polyester mat impregnated with activated charcoal could be used with the cellulose filter and multi-layer filter to remove odors from the air.

Although the filter arrangement disclosed in Frey U.S. Pat. No. 5,593,479 effectively removed fine particles from the air and could be adapted to also remove odors from the air, the use of three separate filters proved confusing to many consumers. The three filter system required the filters to be arranged in a certain order so as to maximize particle and odor removal efficiencies and to maximize the life of the three filter system. The proper arrangement for the three filter system was confusing to many consumers and resulted in the improper arrangement of these filters. In addition to problems in arranging the order of the filters, the three filters had to be correctly positioned with respect to one another so as to obtain the desired pressure drop through the three filter system to obtain the desired particle remove efficiencies. The proper arrangement of the three filters proved to be, at times, tedious, complicated and/or confusing, thus resulting, at times, in reduced filter efficiencies and operating efficiencies. Finally, the three filter system required the user to timely change each filter to maintain the air filtering efficiencies and proper operation of the cleaning system. However, due to the use of three separate filters, confusion sometimes resulted as to when and/or which filter needed to be replaced. As a result, one or more filters would not be timely replaced thereby resulting in subpar operation and filter efficiencies.

As a result, vacuum cleaners, in general, canister type vacuum cleaners, in specific, have not been designed to incorporate a simple filter system which can remove both odors and very small particles entrained in the air.

SUMMARY OF THE INVENTION

The present invention relates to an improved air filtering system, and more particularly to a vacuum cleaner with a novel filtering arrangement which allows a vacuum cleaner, and even more particularly to a canister type vacuum cleaner, to be modified for the purpose of handling a wide variety of particles entrained in the air being drawn through the vacuum cleaner by an electric motor. In addition, the improved filtering system is designed to remove odors from the air as the air passes through the filter system. Thus, the filtering system can be an environmental air cleaning device as well as a standard vacuum cleaner.

In accordance with the present invention, there is provided an improvement in a vacuum cleaner of the type comprising a reduced velocity chamber with a high velocity air inlet, an electric motor, a rotary means driven by the motor to create a vacuum in the chamber, an outlet for exhausting air from the chamber, which air flows in a selected path from the air inlet to the low velocity chamber and out the air exhaust outlet or outlets, and a disposable filter system in the chamber for removing solid particles from the air, which filter layer intersects the air path. The improvement in this type of vacuum cleaner is the provision of a changeable filter system which includes a filter which removes all sizes of particles including particles of less than ten microns in size. In this manner, the filter removes all sizes of particles entrained in the air to provide a significantly cleaner environment. Standard filter mediums filter out approximately 300,000 particles out of 20 million particles which flow into the filter medium. Particles which are ten microns or less in size pass freely through standard filter medium. Such particles include pollen, dust mites, bacteria, viruses, etc. The recirculation of these small particles can spread diseases and/or cause allergic reactions. The improved filter system of the present invention includes a filter which removes all sizes of particles which result in about a 19 million particle removal out of 20 million particles which pass into the improved filter. As a result, over 90% of the particles greater than 12 microns in size are filtered out of the air passing through the improved filter. The improved filter is also designed to remove odors from the air which pass through the filter. The improved filter includes an odor absorbing material to remove odors from the air through the air filter.

In accordance with another aspect of the present invention, the improved filter includes two distinct sections. One section is designed to be a high efficiency particle removing section to remove very small particles from the air passing through the filter. This section may use mechanical and/or electrostatic capture mechanisms to remove particles entrained in the air. This section may be comprised of one or more layers. The second section is designed to be a gas removal section to remove unwanted gasses from the air. This section may also be designed to remove particles from the air. This second section may use mechanical and/or chemical capture mechanisms to remove gasses and particles from the air. This section may comprise one or more layers.

In accordance with yet another aspect of the present invention, the two sections of the improved filter are connected together. In one preferred arrangement, the two sections are connected together by an adhesive. One such adhesive preferably used is a hot melt adhesive.

In accordance with still yet another feature of the present invention, the improved filter minimizes the degree of pressure drop as the air passes through the filter. The relatively low pressure drop through the improved filter enables the filter to be used in vacuum cleaners, such as canister type vacuum cleaners or for various other types of air filter systems.

In accordance with another feature of the present invention, the improved filter both removes small particles and odors in the air as the air passes through the filter. This dual action filter eliminates the need for a separate filter for small particle removal and a separate filter for odor removal.

In accordance with yet another aspect of the present invention, the two sections of the improved filter are connected together so as to maintain the integrity of the sections during operation and to minimize the degree of pressure drop through the filter.

In accordance with still another aspect of the present invention, a disposable filter is used in conjunction with the improved filter to remove large particles entrained in the air prior to the air entering the improved filter. The use of a disposable filter for filtering larger particles from the air enhances the life of the improved filter. The disposable filter can be a paper of cellulose type filter. The disposable filter is preferably generally coterminous to the improved filter.

In accordance with yet another aspect of the present invention, the improved filter is conical in shape to maximize the surface area to provide increased particle removal. In addition, the disposable filter is preferably conical in shape. Consequently, all the filters are sandwiched together thereby minimizing the area of filtration by the filters and to ensure the filters are in the proper position in the vacuum cleaner. This construction allows the use of the filters to be easily adapted for use in a standard canister type vacuum cleaner without modification of the vacuum cleaner.

In accordance with another aspect of the present invention, the improved filter includes a tab, loop or the like to facilitate the ease to which the filter can be positioned in the vacuum cleaner and/or removed from the vacuum cleaner. The tab, loop, etc. may also be used as an indicator for the proper position of the improved filter and/or include information about the filter.

The primary object of the present invention is the provision of a novel filter system that can effectively filter out a majority of the particles entrained in the air and to remove odors in the air as the air passes through the filter without causing a large pressure drop and can be easily used in a vacuum cleaner such as a canister type vacuum cleaner.

Another object of the present invention is the provision of a filter system as described above, which filter system can be changed easily and can be used in a standard canister type vacuum cleaner without modification of existing vacuum cleaner structure.

Yet another object of the present invention is the provision of a filter system which reduces the number of filter components need to remove odors and particles from the air thereby reducing confusion as to assembly and maintenance of the filter system.

Still yet another object of the present invention is the provision of a filter system, as defined above, which filter system has a large area to which the air flowing from the canister toward the exhaust outlet of the vacuum cleaner has a relatively large area compared to a standard circular disc shaped filter element.

Yet another object of the present invention is the provision of a conical filter system adapted to be sandwiched within and held in a nested position with a standard filter element of a canister type vacuum cleaner.

Still a further object of the present invention is the provision of a filter system, of the type defined above, which filter system is fixedly located in the reduced air velocity chamber or area of a vacuum cleaner so that low velocity air passes through the filter system to provide resident time to contact the large surface area of the filter system so as to remove particles from the air being cleaned by the vacuum cleaner.

In accordance with another objective of the present invention, the improved filter and disposable filter are nested together and supported by a support structure.

These and other objects and advantages will become apparent from the following description taken together with the accompanying drawings.

DESCRIPTION OF THE PREFERRED EMBODIMENT

Figure 1:
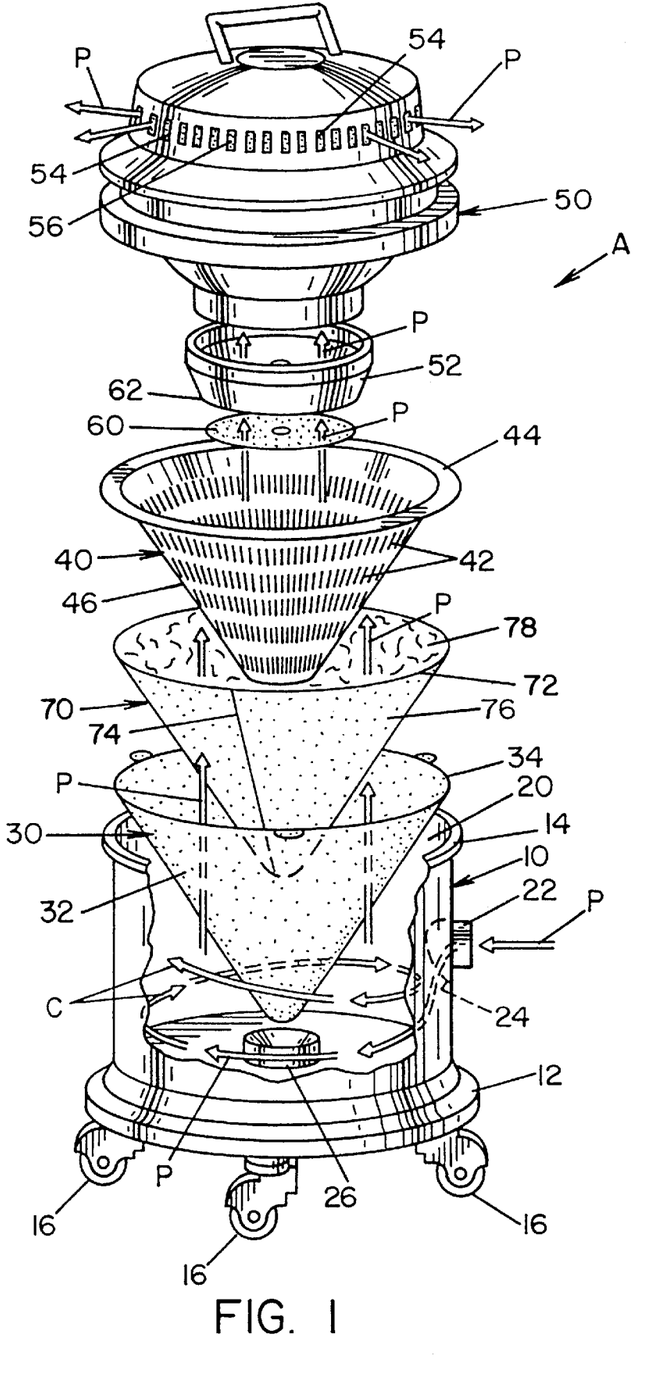
FIG. 1 is a pictorial exploded view of a standard canister type vacuum cleaner employing the improved filter system of the present invention.
Figure 5:
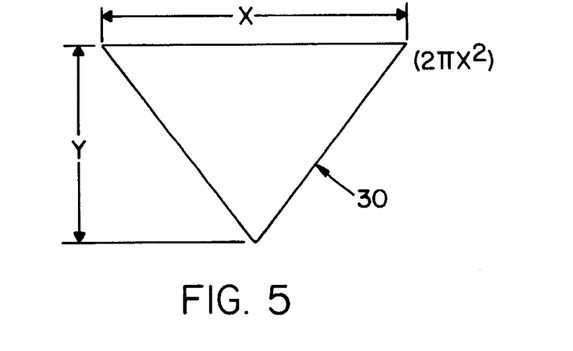
FIG. 5 is a side elevational view showing the geometric configuration of the preferred embodiment of the present invention illustrated in FIGS. 2 and 4.
Figure 6:
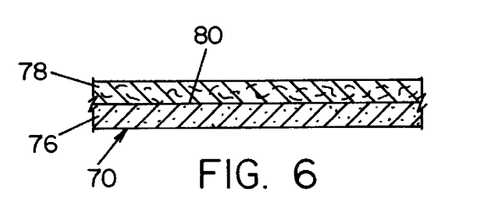
FIG. 6 is a cross-sectional view of the improved filter along line 6—6 of FIG. 4.

Referring now to the drawings wherein the showings are for the purpose of illustrating a preferred embodiment of the invention only and not for the purpose of limiting same, FIG. 1 shows a canister type vacuum cleaner A having a lower generally cylindrical canister 10 with a base 12 and an upper circular opening defined by rim 14. In the illustrated embodiment, a plurality of circumferentially spaced wheels 16 support canister 10 for movement along the floor of a room being cleaned. Canister 10 includes a low velocity chamber 20 with a high velocity inlet 22, an air deflector 24 and a lower filter rest 26. Air flow through the vacuum cleaner is illustrated as arrows defining a path P. In chamber 20 of canister 10, path P is in the form of a vortexed or cyclone portion C of several convolutions so that particles carried by air through chamber 20 are removed by centrifugal force and are retained in the low velocity chamber 20. Thereafter, air flow path P is generally in an upwardly vertical direction so that the air being cleaned moves through a conical filter element, or layer, 30 formed from a flat, non-woven cellulose fiber with an outer conical surface 32 and an upper circular opening 34. The diameter of open end 34 is X and the height of a conical filter 30 is Y, as shown in FIG. 5. In this manner, a substantially increased amount of filtering surface is obtained through use of a conical surface. Otherwise, filtering would be through a circular area defined by the diameter of open end 34. Filter layer 30 is preferably designed to be relatively thin since it includes small interstices to physically block the passage of solid particles. Filter layer 30 is a standard vacuum cleaner filter designed to act as a barrier to relatively large particles entrained in the air. Filter layer 30 removes approximately 300,000 out of 20 million particles from the air as the air passes through filter 30. Very small particles pass freely through filter layer 30. Such filtration efficiency meets standard EPC guidelines.

To retain the conical shape of the relatively unstable conical element 30, there is provided a filter support 40 having a large number of perforations 42 and an upper circular rim 44. When assembled, conical support 40 nests within the thin, conical filter layer 30 and rim 44 clamps the filter layer against rim 14 of canister 10. The outer conical surface 46 bears against the inner conical surface of filter layer 30 in normal practice to support this conical filter element. As so far described, air passes through the thin, non-woven conical cellulose filter 30 through perforations 42 and upwardly in a direction defined by air path P.

In accordance with standard practice, a motor driven fan housing 50, of the type shown in the prior art, includes a lower inlet 52 and an air exhaust shown as a large number of peripherally spaced outlet exhaust openings 54 having a common cylindrical secondary filter 56 for removal of any solid particles reaching housing 50. Secondary filter disc 60 is before motor 50 and is supported by a flat perforated support disc 62. As so far described, canister vacuum cleaner A is constructed in accordance with standard practice.

In accordance with the invention, there is provided a novel filter 70 for removing both small particles and odors from the air passing through the filter. As best shown is FIGS. 3, 4 and 6–8, filter 70 includes an odor removal section 76 and a particle removal section 78. The two sections are connected together by any number of arrangements, i.e. bonding agent, stitching, etc. Preferably a bonding agent 80 is used to secure sections 76, 78 together. One such bonding agent which can be used is an adhesive, such as a hot melt adhesive. Preferably, the bonding agent is applied in a dot matrix pattern to secure sections 76, 78 together so as not to cause a significant increase in pressure drop or a reduction in performance of filter 70.

Odor removal section 76 of filter 70 is designed to remove undesirable gases from the air such as smoke or other undesirable odors. The gas filter section 76 comprises a mat of laid fibers. The fibers extend in all directions in the mat. The fibers are generally parallel to the forming surface on which the fibers are laid. The gas filter section 76 may alternatively be a woven mat, a needled mat or a felted mat. The gas filter section 76 preferably is made up of multiple layers of fibers.

The fibers are preferably cellulosic fibers and/or synthetic textile fibers. The fibers of the mat may be all cellulosic fibers or all synthetic textile fibers or a mixture of cellulosic fibers and synthetic textile fibers. Alternately, one layer of the mat, or one layer may be all cellulosic fibers and another layer of the mat be all synthetic textile layer of the mat may be all cellulosic fibers and another layer of the mat be all synthetic textile fibers, with yet a further layer of the mat may be a mixture of synthetic textile fibers and cellulosic fibers. A wide variety of synthetic fibers may be used including acrylic fibers, polyester fibers, nylon fibers, olefin fibers, and vinyl fibers, and the like. The cellulosic fiber may be cellulose fibers, modified cellulose fibers, methylcellulose fibers, rayon and cotton fibers, although cellulose fibers are preferred.

Deposited on the fibers is a synthetic binder. The binder is designed to connect the fibers together and can be chosen from a wide variety of binders including an acrylic latex, a vinyl latex, an acrylonitrile latex, and an crylate latex. The binder substantially covers the surface area of the fibers, i.e. at least 50% of the fiber surface area, and is in an amount sufficient to bind the fibers together within the mat.

An absorbent powder, preferably in particle form, is disposed on the binder. The absorbent powder may be a variety of powders such as activated carbon, diatomaceous earth, fuller's earth and the like. Portions of the particles contact and are embedded into the binder, but portions of the particles protrude out of the binder and are free from and do not substantially contact the binder. Those protruding portions are, therefore, available to absorb odors as the air passes through the filter layer.

As can be appreciated, odor removal section 76 is also designed to remove particles in the air that have passed through filter layer 30. The particle removal is by a mechanical and/or a chemical mechanism. The close spacing of the fibers making up section 76 mechanically removes particles from the air by not allowing the particles to pass through the filter section. The gas absorbing material in section 76 also can remove materials from the air by chemical attraction. Therefore, section 76 has a dual mechanism for removing particles from the air.

The odor removal section 76 of filter 70 is preferably designed to be resistant to mold, mildew, fungus and bacteria. The odor removal section 76 also is preferably designed to remove odors caused by Aromatic Solvents, Polynuclear Aromatics, Halogenated Aromatics, Phenolics, Aliphatic Amines, Aromatic Amines, Ketons, Esters, Ethers, Alcohols, Fuels, Halogenated Solvents, Aliphatic Acids, Aromatic Acids, etc. The odor removal section 76 may also be treated to resist damage from liquids. Preferably, section 76 has a weight of 100–300 g/m$^2$ and more preferably 150–225 g/m$^2$, and a gas absorbent content of 25%–80% and more preferably 40%–60%.

The particle removal section 78 of filter 70 is designed to remove very small particles from the air. Preferably, section 78 is a high efficiency particulate air (HEPA) filter. Particle removal section 78 is preferably a multi-layer arrangement which removes particles mechanically and/or electrostatically from the air. Preferably the exterior surface layer of section 78 is made up of a relatively durable material so as to resist damage to the filter layer during operation of the air cleaner and/or during insertion on or removal of filter 70 from the air cleaner. The exterior surface is preferably a sheet of polyester, nylon or the like. The exterior surface may be woven or non-woven. Section 78 is preferably formed of materials which resist growth to mold, mildew, fungus or bacteria. The materials also preferably resist degradation over time and are able to withstand extremes in temperatures and humidity, i.e. up to 70° C. (158° F.) and 100% relative humidity. Therefore, the particle removal section 78 is preferably unaffected by normal operating temperatures and water in the air. As a result, the filter 70 can be designed to be, if desired, used in both wet and dry environments. Section 78 is designed to act as a mechanical and/or electrical barrier to prevent air particles from penetrating the fiber layer. Preferably, section 78 removes essentially all particles having a size greater than two microns. Particle removal section 78 preferably has a 99% air filtration efficiency for particles greater than two microns in size. More preferably, section 78 filters out over 99.9% of the particles 2 micron or greater in size, and even more preferably filters over 99% of the particles 0.3 micron or greater in size. For particles from 0.3–2.0 microns, particle removal section 78 has a filtration efficiency of at least 70% and more preferably at least 99.9%. As a result, out of the millions of air particles entering the fiber layer, only a relatively few extremely small particles pass through section 78 of filter 70. The weight of the material of section 78 is 60–150 gm/m$^2$, and more preferably 62–90 gm/m$^2$, which results in a very nominal pressure drop as the air passes through section 78.

The multiple layers of section 78 are connected together by any conventional means. Preferably, they are connected together by a binder and/or needle pointed together. The materials used to form section 78 may be similar to the materials used in section 76.

Figure 7:
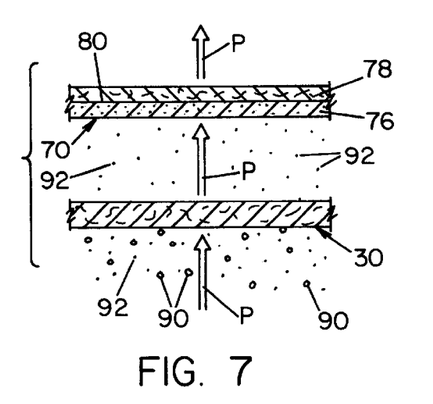
FIG. 7 is a schematic layout view of the air flow through a two filter system.

The combining of odor removal section 76 and particle removal section 78 complements each of the sections of filter 70 thereby resulting in greater particle removal efficiencies. As illustrated in FIG. 7, filter layer 30 mechanically removes the large particles 90 in air stream P. The smaller particles 92 freely pass through filter layer 30. The smaller particles 92 then encounter odor removal section 76 of filter 70. Odor removal section removes odors such as smoke from the air by absorbing such odors as the air passes through odor removal section 76. In addition, odor removal section 76 mechanically, and in some instances, chemically removes smaller particles from air stream P by blocking their passageway and/or absorbing such particles. Odor removal section 76 thus acts as a pre-filter of particles for particle removal section 78. The remaining small particles 92 that pass through odor removal section 76 are mechanically and/or electrically removed from air stream P by adhesive layer 80 and particle removal section 78. Particle removal efficiencies as high as 99.98% for particles 0.1 micron and greater in size and at air flow rates of 10–60 CFM are achievable by filter 70. This filter arrangement has been found to also maximize the life of the filter system.

Figure 8:
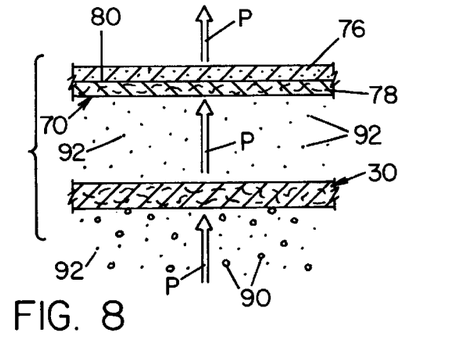
FIG. 8 is a schematic layout view of the air flow through an alternative embodiment of a two filter system.

An alternate embodiment of the invention is shown in FIG. 8. The arrangement of the filter system is the same as shown in FIG. 7 except particle removal section 78 is first exposed to small particles 92 after such particles pass through filter layer 30. The particle removal efficiencies of this filter system arrangement are comparable to the particle removal efficiencies of the filter system arrangement illustrated in FIG. 7. However, it has been found that the life of filter 70 is slightly shortened by this arrangement, but, in some instances, the odor removal efficiencies are increased.

Figure 2:
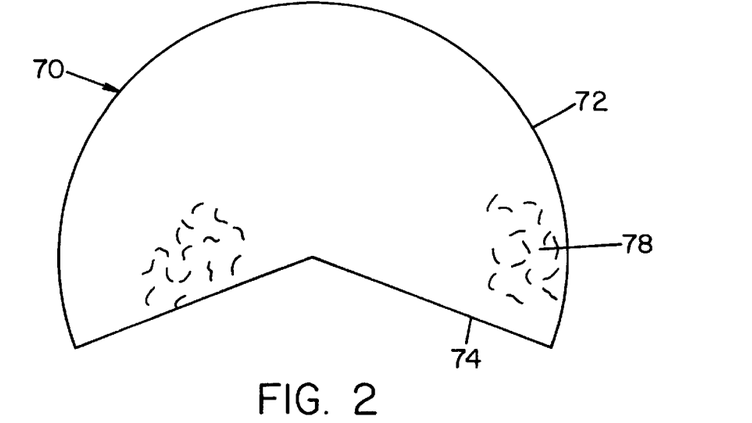
FIG. 2 is a top view of a flat blank of the improved filter cut into a shape for subsequent forming into the preferred embodiment of the present invention.
Figure 3:
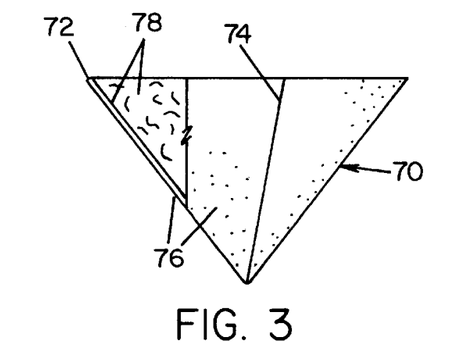
FIG. 3 is a side view of the blank shown in FIG. 2 formed into a conical filter and showing the cross-section of the improved filter partially.
Figure 4:
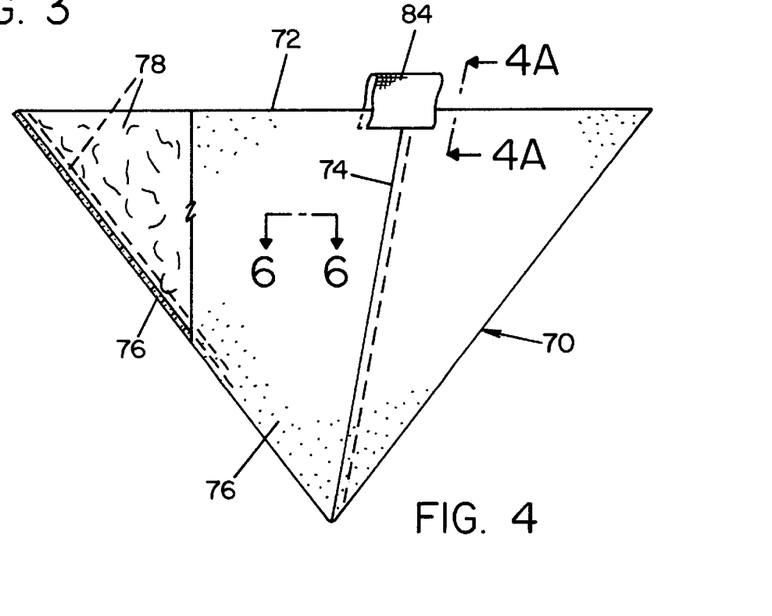
FIG. 4 is a side view of an alternative embodiment of the improved filter shown in FIG. 3.

Referring now to FIG. 2, filter 70 is originally in a sheet form after sections 76 and 78 are connected together. This sheet form is then cut out in a particular shape as shown in FIG. 2. The particular cut of the filter material is then formed into a cone shaped filter as illustrated in FIGS. 3 and 4. This particular shape of filter 70 maximizes the surface area of the filter for canister air cleaning systems utilizing a vortex particle removal system. The ends of the filter material are attached together to form the conical shaped filter 70. Preferably, the ends are connected together by a bonding agent 74, such as a hot melt adhesive. However, the ends of the filter can be connected together by other means such as stitches, staples, VELCRO, or the like.

Figure 4A:
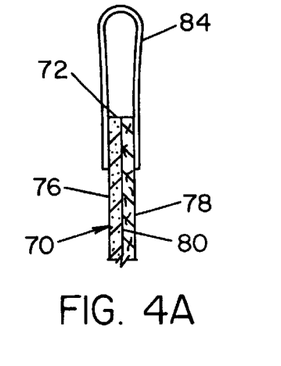
FIG. 4A is a cross-section view of the improved filter along line 4A—4A of FIG. 4.

Referring now to FIGS. 4 and 4A, an alternative embodiment of filter 70 is illustrated. A tab 84 is connected to the top edge 72 of filter 70. Tab 84 is designed to facilitate in the ease of insertion and removal of filter 70 from filter support 40. Tab 84 may also include use, installation and/or replacement information to assist in the operation of the vacuum cleaner A. Tab 84 may also function as a positional indicator to assist the user properly positioning filter 70 in vacuum cleaner A. Finally, tab 84 is preferably positioned on filter 70 to overlap bonding agent 74 which connects the ends of filter 70 together. This positioning of tab 84 helps to protect and secure the seam formed by bonding agent 74. Tab 84 is preferably secured to both sides of filter 70 as shown in FIG. 4A. The tab is preferably secured to filter 70 by a bonding agent such as a hot melt adhesive. However, tab 84 can be connected to filter 70 by other means such as stitching, staples, etc. If desired, tab 84 can be designed to be easily removed by the user.

The formed conical filter 70 preferably nests within conical filter layer 30 and is sandwiched between filter layer 30 and filter support 40. As illustrated in FIGS. 7 and 8, layer 30 acts as a mechanical barrier to prevent large particles 90 from entering into filter 70. The small particles 92 which penetrate the small openings in layer 30 are subsequently filtered out of the air by filter 70. The use of layer 30 extends the life of filter 70 by filtering out the larger particles which can clog up the air passages in filter 70.

Figure 9:
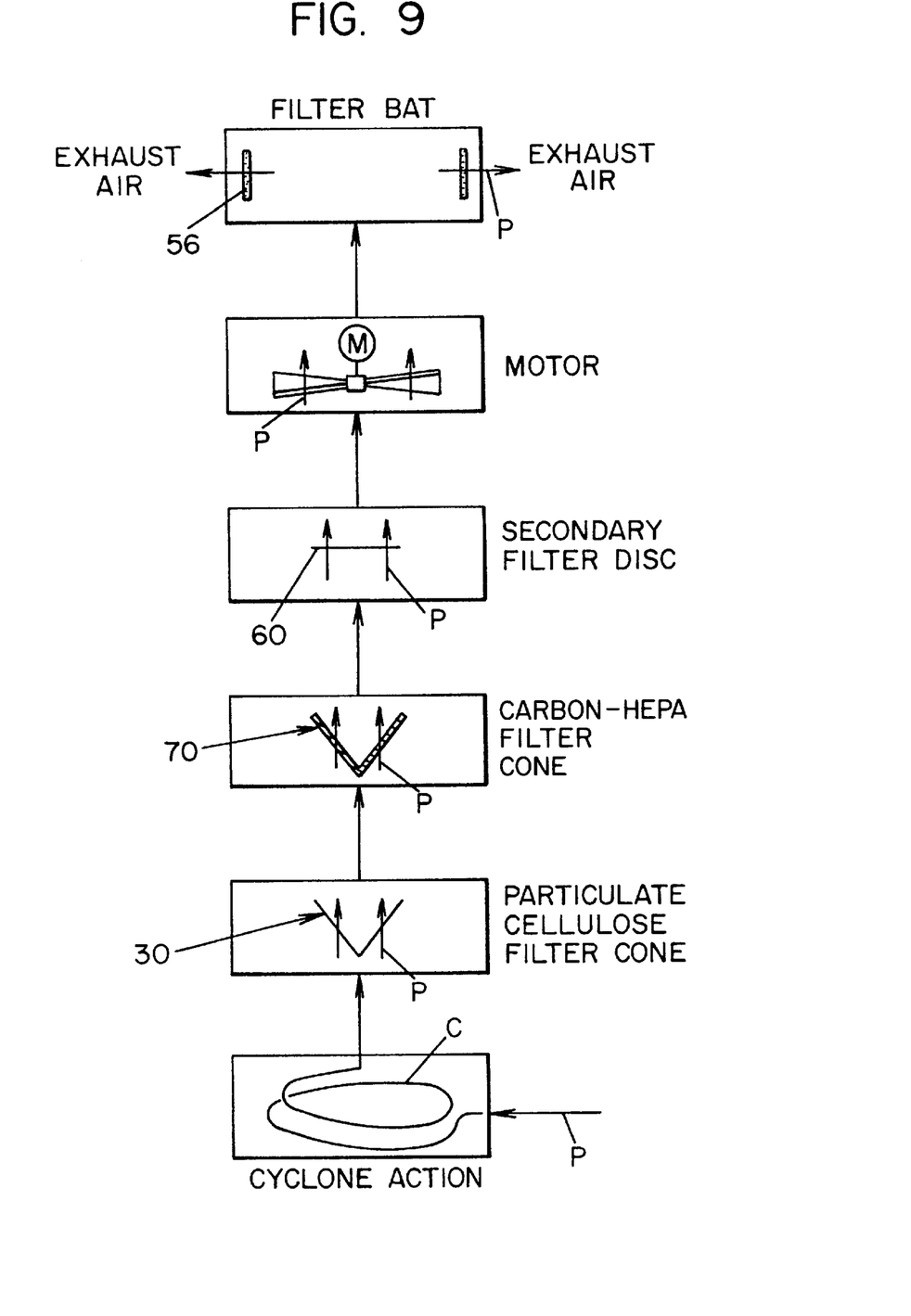
FIG. 9 is a block diagram showing the filtering and operating steps of a canister type vacuum cleaner improved by incorporating the improved filter of the present invention.

Referring now to FIGS. 1 and 9, it is shown that filter 30 and filter 70 are sandwiched together so that air flowing through this filter arrangement is first intercepted by conical filter 30. This filter removes the solid particles which have not been centrifuged out in canister 10. The air particles passing through filter 30 engage sections 76 and 78 of filter 70. In addition, odors and other undesired gases are simultaneously removed from the air as the air passes through section 76 of filter 70. Thus, improved vacuum cleaner A can be used for cleaning fine particles from a room and can help sterilize a room from pollen, bacteria, viruses, microorganisms and the like, and also remove smoke and other unwanted gasses from the air. It is appreciated that the vacuum cleaner can clean the ambient air for a normal household use.

As shown in FIGS. 1 and 9, the air passes upwardly from the cyclone action of canister 20 through exhaust 56 by passing filter 70 positioned between conical filter layer 30 and the flat filter disc, or secondary filter 60. FIG. 9 illustrates a novel method of processing air in a vacuum cleaner, which novel method has not been heretofore available, especially in canister type vacuum cleaners. This novel method allows the vacuum cleaner to be capable of removing ultra fine particles entrained within the air being cleaned, and also to simultaneously remove unwanted gasses from the air.

The dual functions of filter 70 greatly simplifies the operation of vacuum cleaner A. Only two separate filters are required to be changed during the operation of the vacuum cleaner A, i.e. filter 30 and filter 70. The problems associated with the need for separate filters to obtain odorless clean air is solved by this filter system of the present invention. In addition, particle removal efficiencies never before obtained in portable vacuum cleaners are achieved by the filter system of the present invention.

The invention has been described with reference to a preferred embodiment and alternatives thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

Having thus defined the invention, the following is claimed:

1. In a vacuum cleaner or air cleaner comprising a reduced velocity chamber with a high velocity air inlet, an electric motor, a rotary means driven by said motor for creating a vacuum in said chamber, an outlet for exhausting air from said chamber, said air flows in a selected path from said air inlet, through said chamber and out said air exhaust outlet, the improvement comprising a generally conically shaped filter positioned between said air inlet and said motor, said filter including gas removal means for removing gasses in said air and particle removal means for removing at least 99% of particles at least two microns in size in said air, said filter including first and second filter sections and attacher to connect together said first filter section and said second filter section, said first filter section including gas absorption means, said second filter section including means for removing at least 99% of said particles greater than 2 microns in said air.

2. The improvement as defined in claim 1, wherein said attacher including a bonding agent.

3. The improvement as defined in claim 2, wherein said bonding agent comprising of a hot melt adhesive.

4. The improvement as defined in claim 2, wherein said bonding agent being applied in a spaced matrix dot pattern on said first and second filter sections.

5. The improvement as defined in claim 2, wherein said bonding agent being laminated on said first and second filter sections.

6. The improvement as defined in claim 1, wherein said first filter section exposed to said particles in said air prior to said second filter section.

7. The improvement as defined in claim 4, wherein said first filter section exposed to said particles in said air prior to said second filter section.

8. The improvement as defined in claim 1, wherein said second filter including at least two layers, said first layer being connected to said first filter section, said second layer being comprised of a durable abrasion and tear resistant material, said second layer including a material selected from the group consisting of polyester, cotton, nylon and mixtures thereof.

9. The improvement as defined in claim 1, wherein said second filter section including at least two layers, said first layer being connected to said first filter section, said second layer being comprised of a durable abrasion and tear resistant material, said second layer including a material selected from the group consisting of polyester, cotton, nylon and mixtures thereof.

10. The improvement as defined in claim 1, wherein said first filter section including non-woven fibers and a gas absorbing agent bonded to said fibers.

11. The improvement as defined in claim 9, wherein said first filter section including non-woven fibers and a gas absorbing agent bonded to said fibers.

12. The improvement as defined in claim 1, including an arrangement to releasably support said filter means.

13. The improvement as defined in claim 1, including tab means positioned on an edge of said filter.

14. The improvement as defined in claim 11, including tab means positioned on an edge of said filter.

15. A method of cleaning air by use of a canister vacuum cleaner including the steps of:

(a) drawing air through a high velocity air inlet into a low velocity chamber;

(b) centrifuging the air in the low velocity chamber to remove solid particles;

(c) passing said air through a first filter to remove large particles;

(d) passing said filtered air through a particle and gas removing filter to remove gasses and small particles, said particle and gas removing filter including a gas removal section, a particle removal section and an attacher to connect together said gas removal section and said particle removal section, said gas removal section having a gas absorption means, said particle removal section removing at least 99% of said particles greater than 2 microns in said air; and (e) forcing said cleaned air past a motor and out an air outlet.

16. A method as defined in claim 15, wherein said attacher includes a bonding agent.

17. A method as defined in claim 16, wherein said bonding agent applied in a spaced matrix dot pattern or laminated on said gas removal section and said particle removal section.

18. A method as defined in claim 15, including the step of exposing said particle removal section to said air prior to said gas removal section.

19. A method as defined in claim 17, including the step of exposing said particle removal section to said air prior to said gas removal section.

20. A method as defined in claim 15, wherein said particle and gas removing filter being substantially conical in shape.

21. A method as defined in claim 19, wherein said particle and gas removing filter being substantially conical in shape.

22. A method as defined in claim 15, wherein said particle removal section mechanically and/or chemically removes particles from said air.

23. A method as defined in claim 21, wherein said particle removal section mechanically and/or chemically removes particles from said air.

24. A method as defined in claim 15, wherein said gas removal section mechanically and/or electrically removes particles from said air.

25. A method as defined in claim 23, wherein said gas removal section mechanically and/or electrically removes particles from said air.

26. A method as defined in claim 15, wherein said particle removal section includes non-woven fibers and a gas absorbing agent bonded to said fibers.

27. A method as defined in claim 25, wherein said particle removal section includes non-woven fibers and a gas absorbing agent bonded to said fibers.

28. A method as defined in claim 15, wherein said particle and gas removal filter includes a tab to position in and/or remove said particle and gas removal filter from said chamber.

29. A method as defined in claim 27, wherein said particle and gas removal filter includes a tab to position in and/or remove said particle and gas removal filter from said chamber.

* * * * *